AARON A. HINKLEY, OF BOSTON, MASSACHUSETTS.

Letters Patent No. 86,921, dated February 16, 1869.

IMPROVED COMPOSITION FOR WAX-FLOWERS AND FRUIT.

The Schedule referred to in these Letters Patent and making part of the same.

*To all persons to whom these presents may come:*

Be it known that I, AARON A. HINKLEY, of Boston, in the county of Suffolk, and State of Massachusetts, have invented a new and useful Composition for Making what are termed Wax-Flowers or Fruits; and I do hereby declare the same to be fully described in the following specification.

The composition in question consists of white wax, white turpentine, lard, and an essential oil.

I take, for one pound of the wax, one-half ounce of the turpentine, one-quarter ounce of lard, and a sufficient amount of essential oil to neutralize the odor of the turpentine and lard, and impart to the compound the odor of the fruit or flower to be made with it.

These materials or constituents I melt and incorporate together, and when cold, roll the mass into one or more thin sheets, or impart to it such form or forms as may be desirable.

The turpentine renders the wax pliant and tenacious, or removes from it its brittle quality.

The lard aids in rendering it soft and adhesive, and capable of being moulded and of receiving colors to good advantage.

The essential oil is to neutralize the odors of the wax, turpentine, and lard, to impart a different and desirable odor to the whole, and also to aid in softening and otherwise improving the composition.

I do not confine my invention to the precise proportion of its ingredients, as hereinbefore mentioned, as such may be varied more or less, as circumstances may require.

I am aware that in making a composition for wax-work, fir-balsam, spirits of turpentine, and sweet, or olive-oil, have been used, and therefore I make no claim thereto.

Instead of the fir-balsam and the spirits of turpentine, I employ white turpentine, or what is usually termed Venice turpentine. It has an advantage over the fir-balsam and the spirits of turpentine, as with it the composition will retain its softness, and not grow brittle, as it will when the spirits of turpentine and the fir-balsam are used in making it.

Furthermore, I do not use such an essential oil as spirits of turpentine, but only such an essential oil or oils as will neutralize the odors of the white turpentine and lard, and impart to the compound the odor of the flower or fruit to be made or imitated by it.

I also use lard, instead of olive-oil; that is, I use an animal fat, instead of vegetable oil, as the latter readily dries, and leaves the composition brittle, and liable to crack, whereas the animal fat operates to preserve the composition in its normal state, and also renders it more pliant, or better capable of being moulded, than the olive-oil. Consequently,

What I claim, is—

My improved wax-composition, as described, in which not only an animal fat is employed as a constituent with the white or Venice turpentine, but such an essential oil or oils are used as will not only neutralize the odors of the fat and turpentine, but impart to the mixture the odor, or cause it to have the odor of any fruit or flower, for the production or resemblance of which it may be intended.

AARON A. HINKLEY.

Witnesses:
R. H. EDDY,
F. P. HALE, Jr.